US008862429B2

(12) United States Patent
Ando et al.

(10) Patent No.: US 8,862,429 B2
(45) Date of Patent: Oct. 14, 2014

(54) OPERATING HISTORY MANAGEMENT METHOD AND OPERATING HISTORY MANAGEMENT APPARATUS

(75) Inventors: Tomoharu Ando, Niwa-Gun (JP); Hiroshi Ueno, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 460 days.

(21) Appl. No.: 13/245,141

(22) Filed: Sep. 26, 2011

(65) Prior Publication Data

US 2012/0095724 A1    Apr. 19, 2012

(30) Foreign Application Priority Data

Oct. 13, 2010   (JP) ................. 2010-230686

(51) Int. Cl.
*G06F 19/00* (2011.01)
*B23Q 17/00* (2006.01)
*B23Q 17/12* (2006.01)

(52) U.S. Cl.
CPC ............. *B23Q 17/12* (2013.01); *B23Q 17/007* (2013.01)
USPC ....................................................... 702/145

(58) Field of Classification Search
CPC   B25B 21/02; B25B 23/1405; B25B 23/1475; B25B 5/00; G07F 1/32
USPC .................. 702/145, 182–185, 188
See application file for complete search history.

(56) References Cited

U.S. PATENT DOCUMENTS

| 7,742,836 B2 | 6/2010 | Masuya et al. |
| 8,014,903 B2 | 9/2011 | Inagaki |
| 2005/0096873 A1* | 5/2005 | Klein ............................ 702/184 |

FOREIGN PATENT DOCUMENTS

| JP | 05-073745 A1 | 3/1993 |
| JP | 10-328976 A1 | 12/1998 |
| JP | 2008-176559 A | 7/2008 |
| JP | 2009-101495 A | 5/2009 |
| JP | 2010-125570 A | 6/2010 |

OTHER PUBLICATIONS

Japanese Office Action, Japanese Application No. 2010-230686 dated Mar. 17, 2014 (2 pages).

* cited by examiner

*Primary Examiner* — Edward Raymond
(74) *Attorney, Agent, or Firm* — Burr & Brown, PLLC (57) ABSTRACT

At least a rotation speed of a rotary shaft and a vibration acceleration in a frequency domain are stored as an operating history, and the operating history is stored not only when the rotation speed of the rotary shaft varies, but also when a maximum value of the vibration acceleration in the frequency domain exceeds a predetermined threshold. Therefore, variation in the rotation speed of the rotary shaft and the chatter vibration occurrence state can be stored in association with each other. Hence, an operator can learn the rotation speed of the rotary shaft and the chatter vibration occurrence state in association with each other. As a result, chatter vibration can be suppressed easily and effectively.

3 Claims, 7 Drawing Sheets

| LARGE DATA No. | SMALL DATA No. | ITEM |
|---|---|---|
| S COMMAND S4000 | | |
| DATA 1 | DATA 1.1 | DATE<br>TIME<br>TOOL NUMBER<br>MAIN SPINDLE ROTATION SPEED [$\min^{-1}$]<br>VIBRATION FREQUENCY [Hz]<br>VIBRATION |
| | DATA 1.2 | DATE<br>TIME<br>TOOL NUMBER<br>MAIN SPINDLE ROTATION SPEED [$\min^{-1}$]<br>VIBRATION FREQUENCY [Hz]<br>VIBRATION |
| | ⋮ | ⋮ |
| S COMMAND S4500 | | |
| DATA 2 | DATA 2.1 | DATE<br>TIME<br>TOOL NUMBER<br>MAIN SPINDLE ROTATION SPEED [$\min^{-1}$]<br>VIBRATION FREQUENCY [Hz]<br>VIBRATION |
| | ⋮ | ⋮ |

OPERATING HISTORY MANAGEMENT METHOD AND OPERATING HISTORY MANAGEMENT APPARATUS

BACKGROUND OF THE INVENTION

This application claims the entire benefit of Japanese Patent Application Number 2010-230686 filed on Oct. 13, 2010, the entirety of which is incorporated by reference.

TECHNICAL FIELD

The present invention relates to an operating history management method and an operating history management apparatus that manages an operating history such as a rotation speed of a rotary shaft provided in a machine tool.

BACKGROUND ART

Japanese Patent Application Publication No. 5-73745 (JP-A-5-73745) and Japanese Patent Application Publication No. 10-328976 (JP-A-10-328976), for example, describe conventional apparatuses that manage an operating history of a machine tool. The operating history management apparatus described in JP-A-5-73745 is configured to store planning information indicating a production plan, etc. operation information (information indicating whether the machine tool is operative, inactive, or under repair) input from the machine tool, and inspection information input from an inspection device. Further, the operating history management apparatus described in JP-A-10-328976 is configured to store an operating history such as a rotation speed of a rotary shaft and a temporal variation therein as log data when operating conditions of the machine tool vary.

In a machine tool having a rotary shaft, chatter vibration may occur during machining due to low rigidity in a tool, etc. When chatter vibration occurs, chatter marks are formed on a surface of a work piece, causing the precision of a machined surface to deteriorate, and the tool is damaged, leading to a reduction in the tool life. Therefore, in the related art, machining conditions under which chatter vibration is unlikely to occur during subsequent machining are determined by an operator who varies the rotation speed of the rotary shaft on the basis of his/her experience and records an occurrence state of the chatter vibration.

In consideration of the circumstances described above, an operating history management apparatus that stores variation in the rotation speed of the rotary shaft, etc. in association with a chatter vibration occurrence state is desirable in order to suppress chatter vibration easily and effectively. In the operating history management apparatuses described in JP-A-5-73745 and JP-A-10-328976, however, only the operating conditions of the machine tool are stored as the operating history. It is therefore difficult to associate the chatter vibration occurrence state with the rotation speed of the rotary shaft, etc. and as a result, which causes deterioration of the usability.

Further, in the operating history management apparatus described in JP-A-5-73745, it appears that various conditions occurring during an operation are all stored as the operating history, and as a result, a data amount of the operating history increases, making it difficult for the operator to check the operating history.

In the operating history management apparatus described in JP-A-10-328976, on the other hand, the operating history is stored only when the operating conditions vary, and therefore the data amount of the operating history can be suppressed. However, the operating history is stored every time the operating conditions vary, and it is therefore impossible to store the operational state of the machine tool when chatter vibration occurs, for example the rotation speed of the rotary shaft, etc at the moment when the operator notices that chatter vibration is occurring.

SUMMARY OF THE INVENTION

The present invention has been designed in consideration of the problems described above, and an object thereof is to provide an operating history management method and an operating history management apparatus with which a chatter vibration occurrence state and an operational state of a machine tool can be learned in association with each other so that the chatter vibration can be suppressed easily and effectively.

To achieve the object described above, according to a first aspect of the present invention, an operating history management method for managing an operating history of a machine tool including a rotary shaft for rotating a tool or a work piece executes three steps. The first step is to detect a rotation speed of the rotary shaft and a vibration acceleration in a frequency domain occurring in the rotary shaft. The second step is to determine whether or not the detected rotation speed has varied from a previously detected rotation speed and determines whether or not a maximum value of the vibration acceleration in the frequency domain exceeds a predetermined threshold. The third step is to store at least the rotation speed of the rotary shaft and the vibration acceleration in the frequency domain as the operating history when the rotation speed has varied or the maximum value exceeds the predetermined threshold.

According to a second aspect of the present invention, when the rotation speed has varied or the maximum value exceeds the predetermined threshold in the third step according to the first aspect, a determination is made as to whether or not a rotation speed modification command has been input into the machine tool. When the rotation speed modification command has been input, information relating to the rotation speed modification command is added and the operating history is stored in association with the added information relating to the rotation speed modification command. When the rotation speed modification command has not been input, the operating history is stored in association with most recently added information relating to a rotation speed modification command.

According to a third aspect of the present invention, in the third step according to the first aspect or the second aspect, machining point coordinates, an origin of a work piece, a type of the tool mounted on the rotary shaft, a type of a machining program currently underway in the machine tool, as the operating history, a sequence number or a code of the machining program, and either a time at which variation in the rotation speed has been detected or a time at which the maximum value has been determined to have exceeded the predetermined threshold are stored.

Meanwhile, to achieve the object described above, according to a fourth aspect of the present invention, an operating history management apparatus that manages an operating history of a machine tool including a rotary shaft for rotating a tool or a work piece has a rotation speed detection unit, a vibration detection unit, a rotation speed determination unit, a chatter vibration detection unit and a storage unit. The rotation speed detection unit detects a rotation speed of the rotary shaft. The vibration detection unit detects a vibration acceleration in a frequency domain occurring in the rotary shaft. The rotation speed determination unit determines whether or not the detected rotation speed has varied from a previously detected rotation speed. The chatter vibration detection unit determines whether or not a maximum value of the vibration acceleration in the frequency domain exceeds a predetermined threshold. The storage unit stores at least the rotation speed of the rotary shaft and the vibration acceleration in the frequency domain as the operating history when the rotation speed has varied or the maximum value exceeds the predetermined threshold. Further, in the rotation speed detection unit, the operating history is managed by executing the operating history management method according to the first aspect.

According to the first aspect, at least the rotation speed of the rotary shaft and the vibration acceleration in the frequency domain are stored as the operating history, and the operating history is stored not only when the rotation speed of the rotary shaft varies, but also when the maximum value of the vibration acceleration in the frequency domain exceeds the predetermined threshold. Therefore, variation in the rotation speed of the rotary shaft and a chatter vibration occurrence state can be stored in association with each other. Hence, an operator can learn the rotation speed of the rotary shaft and the chatter vibration occurrence state in association with each other. As a result, chatter vibration can be suppressed easily and effectively.

Further, according to the second aspect, when the rotation speed has varied or the maximum value exceeds the predetermined threshold, a determination is made as to whether or not the rotation speed modification command has been input into the machine tool. When the rotation speed modification command has been input, information relating to the rotation speed modification command is added and the operating history is stored in association with the added information relating to the rotation speed modification command. When the rotation speed modification command has not been input, the operating history is stored in association with the most recently added information relating to a rotation speed modification command. In other words, the operating history is stored in association with each input rotation speed modification command. Therefore, the operator can distinguish between operating histories easily in accordance with the information relating to each rotation speed modification command. For example, by determining that an operating history associated with information relating to a newest rotation speed modification command is an operating history to be used to analyze machining conditions, etc. the operator can analyze the machining conditions easily. As a result, chatter vibration can be suppressed effectively.

Furthermore, according to the third aspect, the machining point coordinates, the origin of the work piece, the type of the tool mounted on the rotary shaft, the type of the machining program currently underway in the machine tool, the sequence number or code of the machining program, and either the time at which variation in the rotation speed was detected or the time at which the maximum value was determined to have exceeded the predetermined threshold are stored as the operating history in the third step. Therefore, a more detailed operating history can be obtained.

BRIEF DESCRIPTION OF THE DRAWINGS

FIG. 3 is an illustrative top view showing the rotary shaft housing 1a.

DETAILED DESCRIPTION OF THE INVENTION

An operating history management apparatus (to be referred to hereafter as a management apparatus) and an operating history management method (to be referred to hereafter as a management method) used by the management apparatus according to an embodiment of the present invention will be described in detail below on the basis of the drawings.

Figure 1:
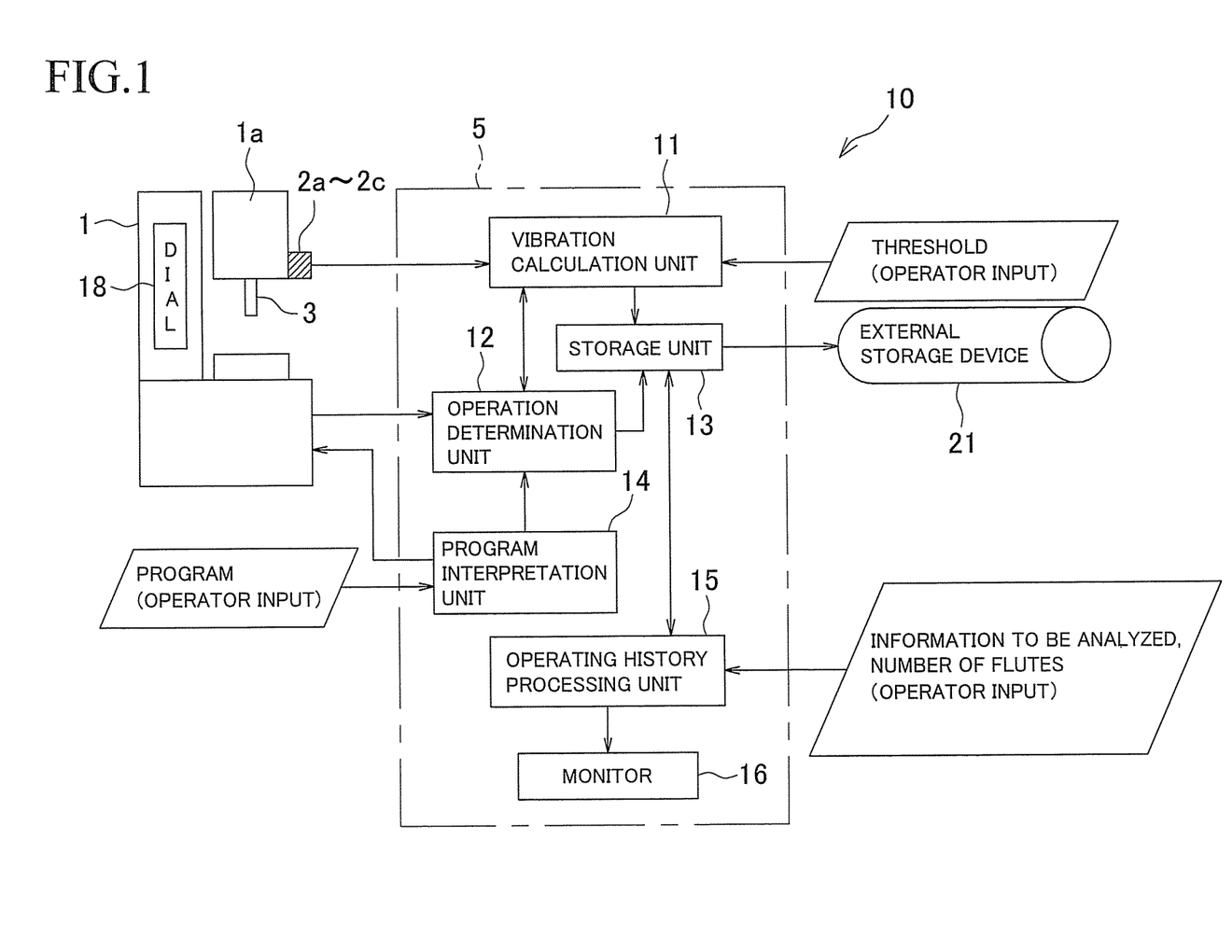
FIG. 1 is a block diagram showing a configuration of a management apparatus 10.
Figure 2:
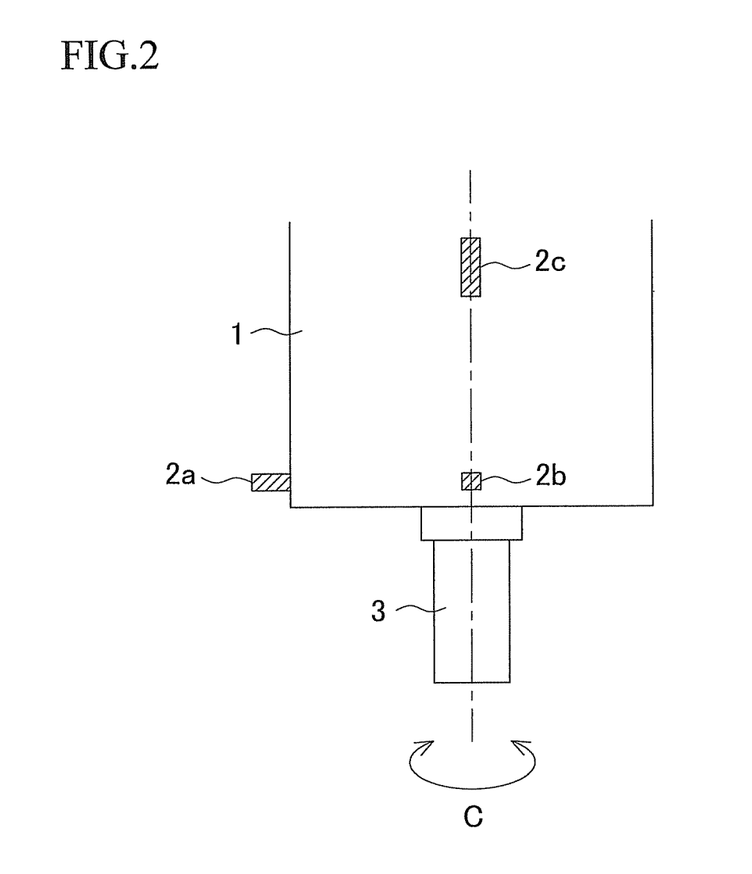
FIG. 2 is an illustrative view showing a rotary shaft housing 1a of a machine tool 1 from the side.
Figure 3:
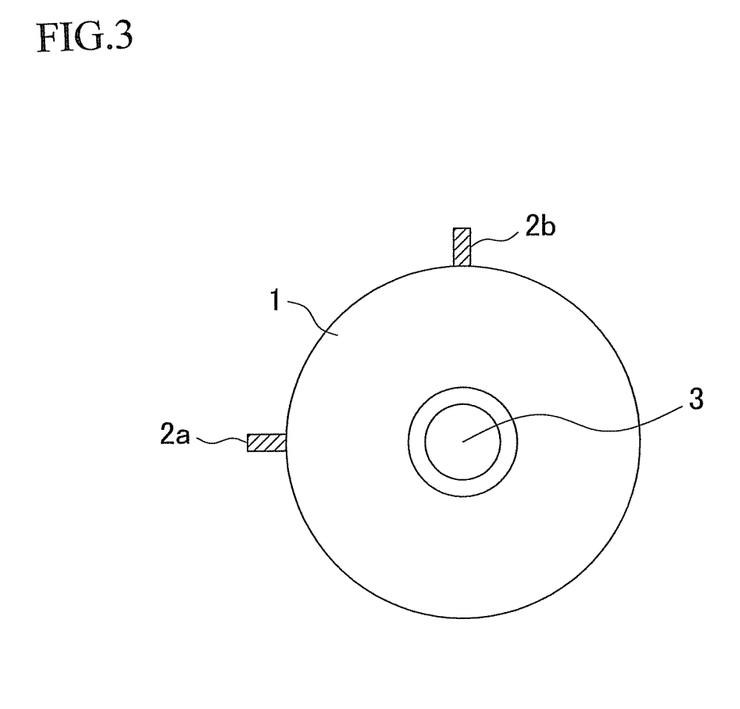

FIG. 1 is a block diagram showing a configuration of a management apparatus 10. FIG. 2 is an illustrative view showing a rotary shaft housing 1a of a machine tool 1 from the side. FIG. 3 is an illustrative top view showing the rotary shaft housing 1a.

The management apparatus 10 manages an operating history of the machine tool 1, which includes the rotary shaft housing 1a, in association with an occurrence state of "chatter vibration" occurring in a rotary shaft 3 provided in the rotary shaft housing 1a to be capable of rotating about an axis C. Further, the management apparatus 10 includes vibration sensors 2a to 2c and a control device 5. The vibration sensors 2a to 2c are sensors for detecting vibration acceleration in a time domain (in other words, vibration acceleration on a temporal axis) which is a characteristic value accompanying vibration in the rotating rotary shaft 3. The control device 5 determines whether or not "chatter vibration" is occurring by analyzing detection values from the vibration sensors 2a to 2c, controls a rotation speed of the rotary shaft 3 in accordance with a program command, and stores the vibration occurring in the rotary shaft 3, the rotation speed of the rotary shaft 3, etc. as the operating history.

As shown in FIGS. 2 and 3, the vibration sensors 2a to 2c are attached to the rotary shaft housing 1 such that one of the vibration sensors detects the vibration acceleration in the time domain in a right-angled direction relative to the other vibration sensors (for example, the vibration sensors 2a to 2c, are attached to detect the vibration acceleration in the time domain in mutually orthogonal X axis, Y axis, and Z axis directions).

Meanwhile, the control device 5 includes a vibration calculation unit 11, an operation determination unit 12, a storage unit 13, a program interpretation unit 14, an operating history processing unit 15 and a monitor 16. The vibration calculation unit 11 determines vibration acceleration in a frequency domain (vibration acceleration on a frequency axis) by performing analysis based on the vibration acceleration in the time domain detected by the vibration sensors 2a to 2c and compares a maximum value of the vibration acceleration in the frequency domain with a (preset) predetermined threshold. The operation determination unit 12 determines operating conditions of the machine tool 1 such as the rotation speed of the rotary shaft 3. The storage unit 13 stores data relating to the vibration detected by the vibration sensors 2a to 2c and the operating history of the machine tool 1, such as the rotation speed of the rotary shaft 3. The program interpretation unit 14 controls a machining operation of the machine tool 1 in accordance with a machining program input by an operator. The operating history processing unit 15 displays the operating history stored in the storage unit 13 selectively and switches an operating history display mode. The monitor 16 serves as a display unit. Further, the storage unit 13 is connected to an external storage device 21 provided separately to the management apparatus 10, and is thus capable of reading the operating history, etc. to the external storage device 21 so that the operating history, etc. are stored therein. It should be noted that the reference number 18 is a dial which is for modifying the rotation speed of the rotary shaft 3, and which is provided on the machine tool 1, and the operation of this dial 18 modifies the rotation speed of the rotary shaft 3 independently of a rotation speed modification command issued by the program interpretation unit 14.

Figure 4:
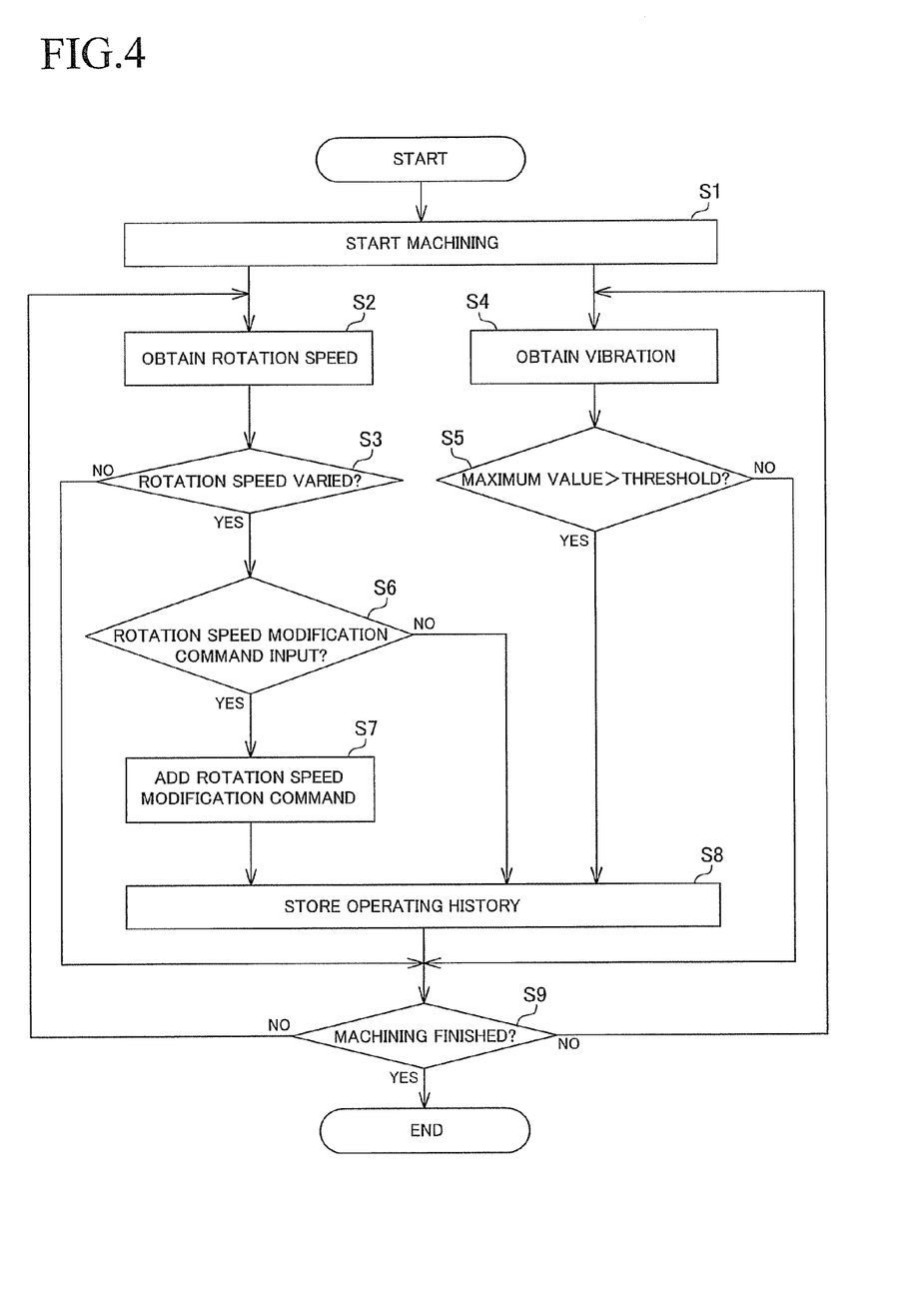
FIG. 4 is a flowchart relating to operating history management control performed in relation to the machine tool 1.

Operating history management control performed on the machine tool 1 by the control device 5 will now be described on the basis of a flowchart shown in FIG. 4.

The program interpretation unit 14 of the control device 5 controls the machining performed by the machine tool 1 by interpreting the machining program input by the operator and varying the rotation speed of the rotary shaft 3 provided in the machine tool 1 in accordance with the program. To vary the rotation speed of the rotary shaft 3 on the basis of the program, the program interpretation unit 14 transmits a rotation speed modification command to the machine tool 1. It should be noted that the program interpretation unit 14 also transmits the rotation speed modification command to the operation determination unit 12.

Figure 5:
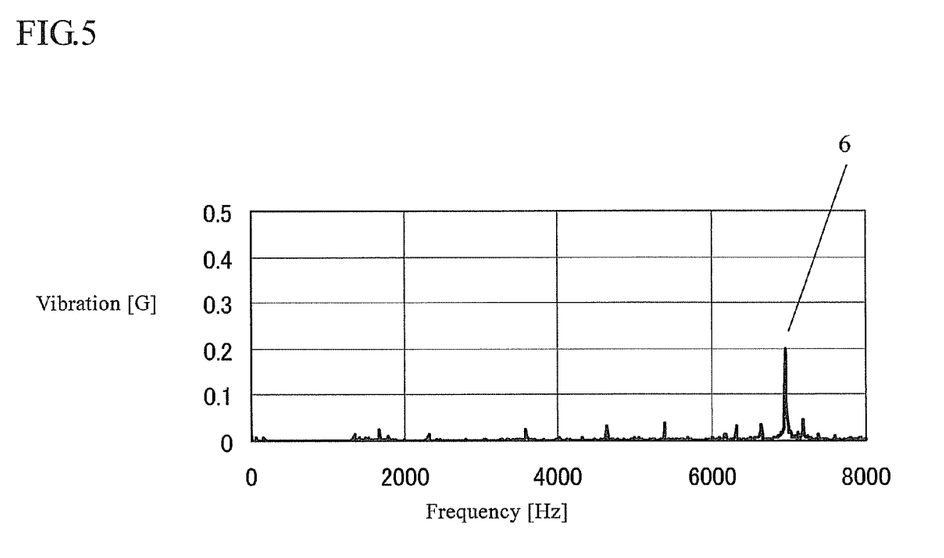
FIG. 5 is an illustrative view showing an example of Fourier analysis results relating to vibration acceleration in a time domain.

When machining by the machine tool 1 begins on the basis of the control performed by the program interpretation unit 14 in the manner described above (S1), the operation determination unit 12 obtains the rotation speed of the rotary shaft 3 from the machine tool 1 via a rotation speed detection sensor (not shown) or the like provided in the rotary shaft housing 1a (S2) and determines whether or not the rotation speed of the rotary shaft 3 has varied (S3). The vibration calculation unit 11, meanwhile, obtains the maximum value of the vibration acceleration (a maximum acceleration, corresponding to a vibration level 6 in FIG. 5) by performing Fourier analysis on the vibration acceleration in the time domain detected by the vibration sensors 2a to 2c during a rotation of the rotary shaft 3. Subsequently, the vibration calculation unit 11 analyzes a relationship between a frequency of the rotary shaft 3 and the vibration acceleration in the frequency domain (the vibration acceleration on the frequency axis) of the rotary shaft 3 at the frequency, as shown in FIG. 5 (S4), and determines whether or not the maximum value exceeds the preset predetermined threshold (S5). The operation determination unit 12 and the vibration calculation unit 11 respectively obtain the rotation speed and the vibration acceleration, and perform the respective determinations described above constantly in real time until the machining is complete (YES in S9).

When variation in the rotation speed of the rotary shaft 3 is detected in S3, the operation determination unit 12 determines whether or not the rotation speed has been varied in accordance with the program, or in other words whether or not the rotation speed modification command has been input into the machine tool 1 from the program interpretation unit 14 (S6). When input of the rotation speed modification command is confirmed (YES in S6), information relating to the rotation speed modification command is added to the storage unit 13 (S7), and an operating history (for example, the rotation speed of the rotary shaft 3, the vibration acceleration in the frequency domain at a point where variation in the rotation speed was detected, a feed speed of the rotary shaft 3, machine coordinates of a machining point, an origin of a work piece, the type of the tool mounted on the rotary shaft 3, the type of the machining program, a sequence number in the machining program, a program code currently underway, the time at which variation in the rotation speed was detected, etc.) is stored in the storage unit 13 in association with the added information relating to the rotation speed modification command (S8). On the other hand, when the rotation speed has not been varied in accordance with the rotation speed modification command, for example when the rotation speed has been varied by operating the dial 18 or the like (NO in S6), an operating history such as that described above is stored in the storage unit 13 in association with most recently added information relating to a rotation speed modification command (S8). It should be noted that when the operating history is stored, information indicating the vibration is stored in the storage unit 13 from the vibration calculation unit 11.

When a situation in which the maximum acceleration exceeds the threshold is detected (in other words, when chatter vibration is detected) in S4, the vibration calculation unit 11 and the operation determination unit 12 also store an operating history such as that described above (for example, the rotation speed of the rotary shaft 3 at a point where chatter vibration was detected, the vibration acceleration in the frequency domain including the maximum acceleration exceeding the threshold, the feed speed of the rotary shaft 3, the machine coordinates of the machining point, the origin of the work piece, the type of the tool mounted on the rotary shaft 3, the type of the machining program, the sequence number in the machining program, the program code currently underway, the time at which chatter vibration was detected, etc.) in the storage unit 13 in association with the most recently added information relating to a rotation speed modification command (S8).

When the machining is not finished, S2 to S5 are repeated. Every time variation in the rotation speed and chatter vibration are detected, the operations of S6 to S8 are executed, whereby the operating history is stored in the storage unit 13.

Figure 6:
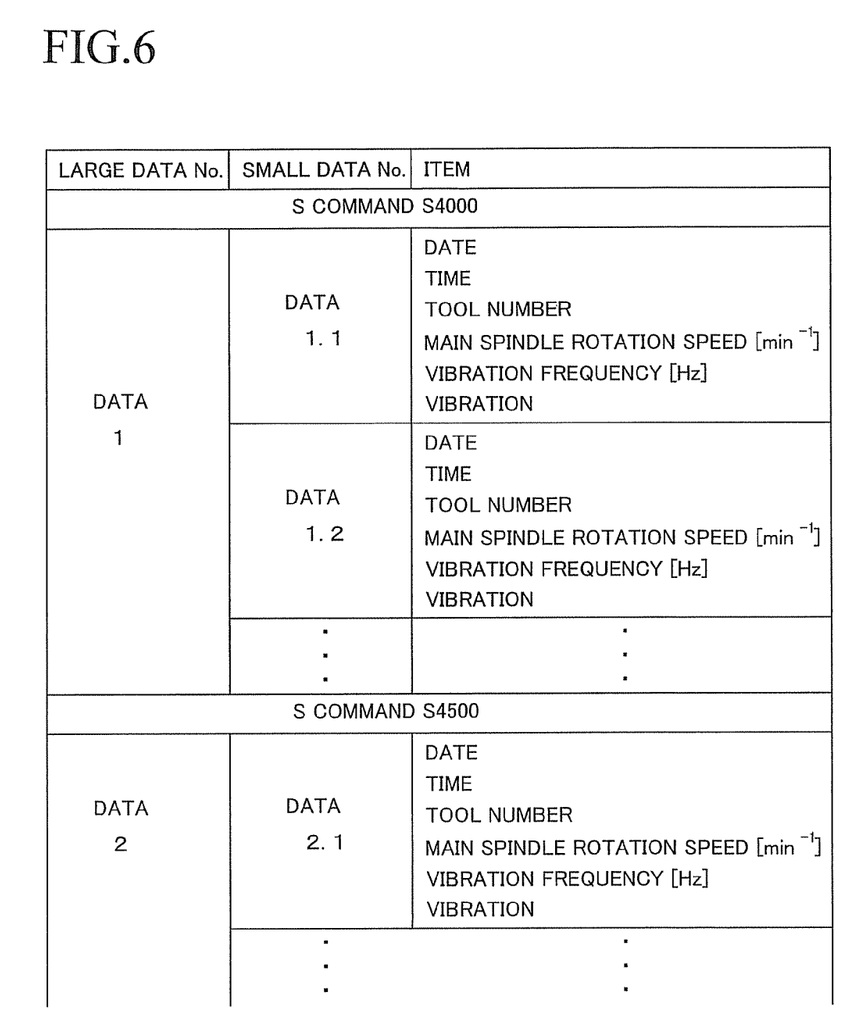
FIG. 6 is an illustrative view showing an example of display of an operating history.

With the management device 10 and management method according to this embodiment, the operating history is stored in the manner described above. Therefore, operating histories are stored in association with the information relating to each rotation speed modification command, as shown in FIG. 6. Hence, by displaying the operating histories on the monitor 16 via the operating history processing unit 15, the operator can differentiate between the operating histories stored in the storage unit 13 easily in accordance with the information relating to each rotation speed modification command. For example, by determining that an operating history associated with information relating to a newest rotation speed modification command is an operating history to be used to analyze the machining conditions, etc. the operator can analyze the machining conditions easily. As a result, chatter vibration can be suppressed effectively. It should be noted that a vibration frequency shown in FIG. 6 denotes a frequency at which the vibration acceleration in the frequency domain takes the maximum value, while a vibration shown in FIG. 6 denotes the maximum value of the vibration acceleration in the frequency domain.

Further, the operating history is stored only when the rotation speed of the rotary shaft 3 varies or when the maximum value of the vibration acceleration in the frequency domain exceeds the predetermined threshold. Therefore, a data amount of the operating history can be suppressed. Moreover, since the operating history is stored in accordance with the chatter vibration occurrence state as well as rotation speed variation, the operator can learn the rotation speed of the rotary shaft and the chatter vibration occurrence state in association with each other. As a result, chatter vibration in the rotary shaft 3 can be suppressed easily and effectively.

Figure 7:
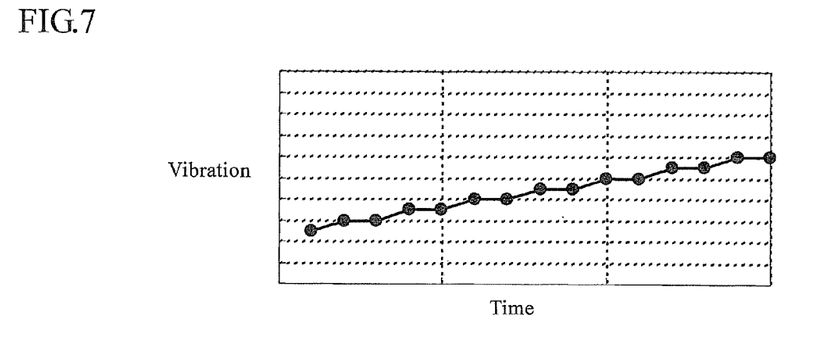
FIG. 7 is an illustrative view showing an example of analysis results based on the operating history.

Furthermore, when the information relating to vibration based on the operating histories stored in the storage unit 13 is displayed on the monitor 16 in time series by the operating history processing unit 15 as shown in FIG. 7. A wear condition of the tool mounted on the rotary shaft 3 can be learned, for example. More specifically, when the vibration (the maximum value of the vibration acceleration in the frequency domain) increases within a short period, as shown in FIG. 7, it may be determined that the machining conditions are not suitable for the tool.

Figure 8:
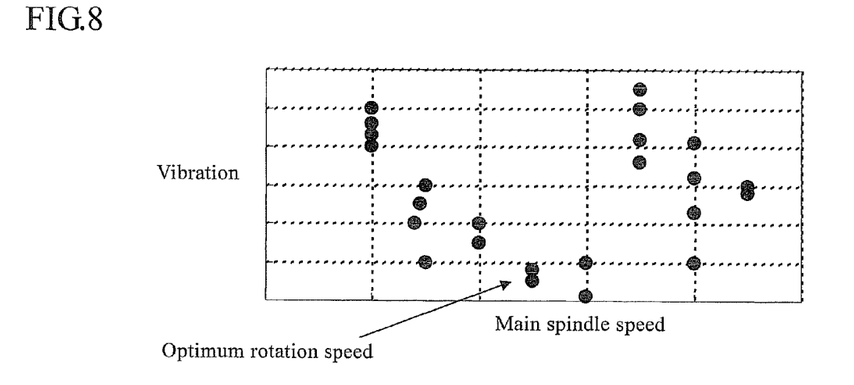
FIG. 8 is an illustrative view showing another example of analysis results based on the operating history.

Further, by having the operating history processing unit 15 plot the operating histories in a plane having the vibration (the maximum value of the vibration acceleration in the frequency domain) on the ordinate and the rotation speed on the abscissa, as shown in FIG 8, and display the plotted operating histories on the monitor 16, chatter vibration can be suppressed with maximum effectiveness. In other words, a rotation speed at which vibration is minimized can be learned extremely easily.

Figure 9:
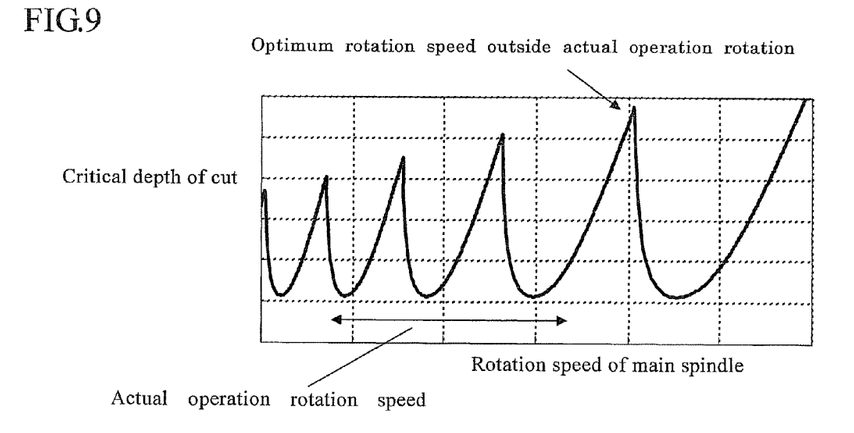
FIG. 9 is an illustrative view showing a further example of analysis results based on the operating history.

The operating history processing unit 15 may also determine a stability limit diagram such as that shown in FIG. 9 on the basis of the operating histories stored in the storage unit 13. A conventional method such as that described in "''Inverse Identification of a Transfer Function with Experimental Results in End Milling", 2008 JSPE Spring Conference, Proceedings of Semestrial Meeting" or the like, for example, may be employed as a method for determining the stability limit diagram. A stable rotation speed in a non-executed speed range can be calculated by determining the stability limit diagram. Therefore, a stable rotation speed can be predicted using a periodicity of a stability limit line.

It should be noted that the management method and management apparatus according to the present invention are not limited in any way to the embodiment described above, and configurations relating to the detection portion, the control device, the operating history management control executed by the control device, etc. may be modified appropriately as necessary without departing from the scope of the present invention.

For example, in the description of the above embodiment, the management apparatus includes the dial 18 and manages the operating history of a type of machine tool in which the rotation speed can be modified by the operator independently of a program. Instead, however, the management apparatus may manage the operating history of a machine tool installed with a rotation speed control device capable of modifying the rotation speed of the rotary shaft automatically.

Further, in the above embodiment, the vibration acceleration of the rotary shaft is detected by the vibration sensors. Instead, however, a displacement and a sound pressure of the rotary shaft corresponding to the vibration may be detected, an optimum rotation speed may be calculated on the basis of the displacement and the sound pressure, and the vibration acceleration may be detected on the basis of a current value of a motor for the rotary shaft or a feed spindle for feeding the rotary shaft.

Furthermore, the management apparatus 10 may be connected to an external computer via a network so that the operating histories stored in the storage unit 13 can be checked on the external computer and the machining conditions can be analyzed on the basis of the operating histories.

Moreover, in the above embodiment, vibration in the rotary shaft of the machine tool is detected, but vibration on a non-rotating side (a fixed side) may be detected instead. Further, the present invention is not limited to a machining center for rotating a tool, and may also be applied to a machine tool such as a lathe for rotating a work piece. It should be noted that the disposal position, number, etc. of the vibration detection portion may be modified appropriately in accordance with the type, size, etc. of the machine tool.

What is claimed is:

1. An operating history management method, by a management apparatus, for managing an operating history of a machine tool that includes a rotary shaft for rotating a tool or a work piece, wherein
   the method executes:
   a first step of detecting a rotation speed of the rotary shaft and a vibration acceleration in a frequency domain occurring in the rotary shaft;
   a second step of determining whether or not the detected rotation speed has varied from a previously detected rotation speed and determining whether or not a maximum value of the vibration acceleration in the frequency domain exceeds a predetermined threshold; and
   a third step of determining as to whether or not a rotation speed modification command has been input into the machine tool when the rotation speed has varied or the maximum value exceeds the predetermined threshold,
   when the rotation speed modification command has been input, adding information relating to the rotation speed modification command and storing at least the rotation weed of the rotary shaft and the vibration acceleration in the frequency domain as the operating history in association with the added information relating to the rotation speed modification command, and
   when the rotation speed modification command has not been input, storing the operating history in association with most recently added information relating to the rotation speed modification command.

2. The operating history management method according to claim 1, wherein machining point coordinates, an origin of a work piece, a type of the tool mounted on the rotary shaft, a type of a machining program currently underway in the machine tool, a sequence number or a code of the machining program, and either a time at which variation in the rotation speed has been detected or a time at which the maximum value has been determined to have exceeded the predetermined threshold are stored as the operating history in the third step.

3. An operating history management apparatus that manages an operating history of a machine tool that includes a rotary shaft for rotating a tool or a work piece, comprising:
   a rotation speed detection unit that detects a rotation speed of the rotary shaft;
   a vibration detection unit that detects a vibration acceleration in a frequency domain occurring in the rotary shall;
   a rotation speed determination unit that determines whether or not the detected rotation speed has varied from a previously detected rotation speed;
   a chatter vibration detection unit that determines whether or not a maximum value of the vibration acceleration in the frequency domain exceeds a predetermined threshold;
   an operation determination unit that determines as to whether or not a rotation speed modification command has been input into the machine tool when the rotation speed has varied or the maximum value exceeds the predetermined threshold; and a storage unit, when the rotation speed has varied or the maximum value exceeds the predetermined threshold, that adds information relating to the rotation speed modification command and stores at least the rotation speed of the rotary shaft and the vibration acceleration in the frequency domain as the operating history in association with the added information relating to the rotation speed modification command when the rotation speed modification command has been input, and further that stores the operating history in association with most recently added information relating to the rotation speed modification command wherein the operating history management method according to claim 1 is executed to manage the operating history.

\* \* \* \* \*